US012807140B2

(12) United States Patent
Zhang et al.

(10) Patent No.: US 12,807,140 B2
(45) Date of Patent: Nov. 24, 2026

(54) VEHICLE CONTROL DEVICE

(71) Applicants: TOYOTA JIDOSHA KABUSHIKI KAISHA, Toyota (JP); DENSO CORPORATION, Kariya-city (JP)

(72) Inventors: Gang Zhang, Saitama (JP); Makoto Aso, Mishima (JP); Eiichiroh Murata, Ashigara kami-gun (JP); Takaharu Oguri, Tokyo-to (JP)

(73) Assignees: TOYOTA JIDOSHA KABUSHIKI KAISHA, Toyota (JP); DENSO CORPORATION, Kariya-city (JP)

( * ) Notice: Subject to any disclaimer, the term of this patent is extended or adjusted under 35 U.S.C. 154(b) by 55 days.

(21) Appl. No.: 19/032,517

(22) Filed: Jan. 21, 2025

(65) Prior Publication Data

US 2025/0236290 A1 Jul. 24, 2025

(30) Foreign Application Priority Data

Jan. 24, 2024 (JP) ................................ 2024-008742

(51) Int. Cl.
*B60W 30/09* (2012.01)
*B60W 30/095* (2012.01)
*B60W 40/04* (2006.01)

(52) U.S. Cl.
CPC ........ *B60W 30/09* (2013.01); *B60W 30/0956* (2013.01); *B60W 40/04* (2013.01); *B60W 2554/404* (2020.02)

(58) Field of Classification Search
CPC .. B60W 30/09; B60W 30/0956; B60W 40/04; B60W 2554/404; B60W 2554/4029; B60W 2554/4042
See application file for complete search history.

(56) References Cited

U.S. PATENT DOCUMENTS

| | | | | |
|---|---|---|---|---|
| 2019/0225231 | A1 | 7/2019 | Ohara et al. | |
| 2021/0295058 | A1* | 9/2021 | Hashimoto | G06T 7/277 |
| 2021/0402991 | A1* | 12/2021 | Gautam | G06N 3/049 |
| 2022/0204029 | A1* | 6/2022 | Chen | G01S 17/42 |
| 2023/0406359 | A1* | 12/2023 | Fasola | B60W 50/023 |
| 2024/0119827 | A1* | 4/2024 | Ishigooka | G08B 25/016 |
| 2024/0308502 | A1* | 9/2024 | Yamazaki | B60T 7/22 |

FOREIGN PATENT DOCUMENTS

| | | | |
|---|---|---|---|
| JP | 2001-283389 | A | 10/2001 |
| JP | 2018-101434 | A | 6/2018 |
| JP | 2019-128614 | A | 8/2019 |

* cited by examiner

*Primary Examiner* — David P. Merlino
(74) *Attorney, Agent, or Firm* — Dinsmore & Shohl LLP

(57) ABSTRACT

A vehicle control device has a processor configured to detect a moving object based on environment information representing an environment surrounding a vehicle, estimate a first state of the moving object at an estimation time where a first forward time has elapsed, based on detection information representing the detected moving object, and to decide to control the vehicle based on the estimated first state of the moving object, wherein the first forward time is the sum of a representative estimation time required to estimate the first state of the moving object, a representative relay time required to relay the estimated first state of the moving object, a representative decision time required to decide on control of the vehicle, and a second forward time which allows the decided control to be carried out.

3 Claims, 6 Drawing Sheets

VEHICLE CONTROL DEVICE

CROSS-REFERENCE TO RELATED APPLICATIONS

This application claims priority to Japanese Patent Application No. 2024-008742 filed Jan. 24, 2024, the entire contents of which are herein incorporated by reference.

FIELD

The present disclosure relates to a vehicle control device.

BACKGROUND

A vehicle-mounted control device detects objects around the vehicle. The control device controls the vehicle so that a safe distance is maintained between the vehicle and detected objects.

When the control device has detected a moving object, the control device estimates the future location of the moving object based on the past location and velocity of the moving object (see Japanese Unexamined Patent Publication No. 2019-128614, for example). When the future location of the moving object is ahead of the vehicle, the control device may give the driver a warning and/or halt the vehicle.

SUMMARY

Processing for estimating the future locations of moving objects requires a relatively long time. When the vehicle and a moving object approach each other during such processing, there may not be enough time to control the vehicle.

In some embodiments, the detection time at which an object is detected may be a time sufficiently before the estimation time at which the future location of the object is estimated. This introduces the issue of how long before the estimation time the detection time should be.

When the period between the detection time and the estimation time is short then there will be less time to control the vehicle, potentially making it impossible to ensure vehicle safety. When the period between the detection time and estimation time is long, estimation precision for the future location of the moving object will be lower, also potentially making it impossible to ensure vehicle safety.

It is an object of the present disclosure to provide a vehicle control device that can accurately estimate the future state of a detected moving object and can control the vehicle with ample time, based on the estimated future state of the moving object.

(1) One embodiment of the present disclosure provides a vehicle control device. The vehicle control device has a processor configured to detect a moving object based on environment information representing an environment surrounding a vehicle, estimate a first state of the moving object at an estimation time where a first forward time has elapsed, based on detection information representing the detected moving object, and decide to control the vehicle based on the estimated first state of the moving object, wherein the first forward time is the sum of a representative estimation time required to estimate the first state of the moving object, a representative relay time required to relay the estimated first state of the moving object, a representative decision time required to decide on control of the vehicle, and a second forward time which allows the decided control to be carried out.

(2) The vehicle control device of embodiment (1), the processor is further configured to begin detection of the moving object at a detection time having a predetermined detection cycle, with at least some of processing for estimating the first state of the moving object being carried out in parallel with processing for detection of the moving object at the detection time in the next detection cycle, and determine whether or not the first state of the moving object is correct as estimated based on the detection information representing the detected moving object at the detection time during the previous detection cycle, based on the detection information representing the detected moving object at the detection time during the next detection cycle.

(3) The vehicle control device of embodiment (2), the processor is further configured to estimate a second state of the moving object in a period of time shorter than time required for estimating the first state of the moving object, based on the detection information representing the moving object detected at the detection time in the next detection cycle, and decide to control the vehicle based on the estimated first state of the moving object when it has been determined that the estimated first state of the moving object is correct, and to decide to control the vehicle based on the estimated second state of the moving object when it has been determined that the estimated first state of the moving object is not correct.

(4) The vehicle control device of embodiment (3), the processor is further configured to estimate the first state of the moving object using a trained classifier, and to estimate the second state of the moving object using linear prediction.

(5) The vehicle control device of any one of embodiments (1) to (4), the first forward time is obtained by subtracting the representative detection time required for detection of the moving object, from a sum of a third forward time between the estimation time at which the first state of the moving object is estimated based on the detection information representing the detected moving object and the time at which processing for detection of the moving object begins, assuming that processing has begun for detection of the moving object at the time where processing for decision of control of the vehicle begins, and the representative estimation time, the representative relay time and the representative decision time.

Since the vehicle control device of the disclosure can estimate the future state of a detected moving object and can control the vehicle with ample time, based on the estimated future state of the moving object, the vehicle control device is able to carry out safe control of the vehicle.

The object and advantages of the present disclosure will be realized and attained by the elements and combinations particularly specified in the claims. It is to be understood that both the foregoing general description and the following detailed description are exemplary and explanatory and are not restrictive of the present disclosure, as claimed.

DESCRIPTION OF EMBODIMENTS

Figure 1A:
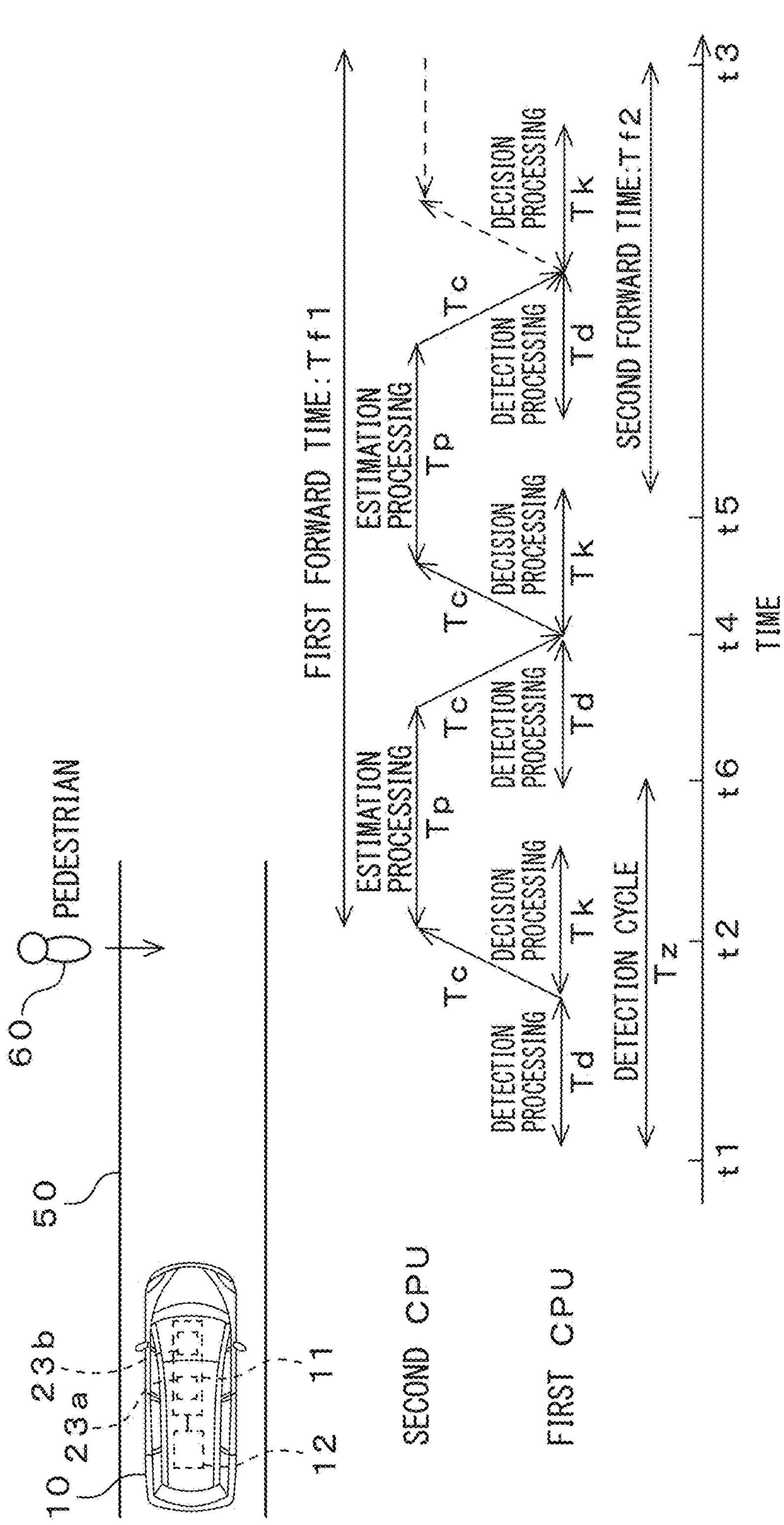
FIG. 1A is a diagram showing operation of an object detector of a first embodiment in overview, and showing a vehicle.
Figure 1B:
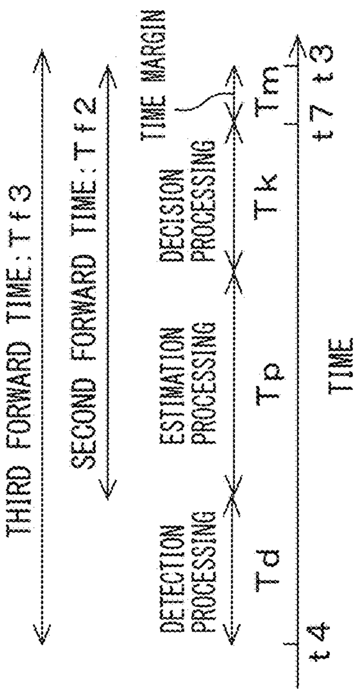
FIG. 1B is a diagram showing operation of the object detector of the first embodiment in overview, and showing a second forward time.

FIG. 1A is a diagram showing operation of an object detector 11 of the first embodiment in overview, and FIG. 1B shows a second forward time. Operation relating to vehicle control processing by the object detector 11 of the first embodiment disclosed herein will now be described in overview with reference to FIG. 1A and FIG. 1B. The object detector 11 is an example of the vehicle control device.

A vehicle 10 is traveling on a road 50, as shown in FIG. 1A. The vehicle 10 has an object detector 11 and an automatic control device 12. The object detector 11 detects objects around the vehicle 10 based on environment information representing an environment surrounding the vehicle 10, obtained by camera images, for example. The automatic control device 12 controls the vehicle 10 based on the locations of detected objects, and information detected using a sensor mounted on the vehicle 10. The vehicle 10 may also be a self-driving vehicle.

When the object detector 11 has detected a moving object such as a pedestrian, the object detector 11 estimates the future location of the moving object. The object detector 11 has a first CPU 23*a* (Central Processing Unit) and a second CPU 23*b*. The first CPU 23*a* and second CPU 23*b* carry out information processing for the object detector 11.

When a pedestrian is located ahead of the vehicle 10, there is a risk that the vehicle 10 may contact with the pedestrian. The object detector 11 therefore estimates the future location of the pedestrian and decides to control the vehicle 10 based on the location of the pedestrian.

First, at time t1, the first CPU 23*a* of the object detector 11 begins detection of a pedestrian 60 based on environment information representing the environment surrounding the vehicle 10. The time required for detection processing by the first CPU 23*a* is Td.

The first CPU 23*a* notifies the second CPU 23*b* of the pedestrian information representing the pedestrian 60. The time required for notification of the pedestrian information representing the pedestrian 60 from the first CPU 23*a* to the second CPU 23*b* is Tc. The pedestrian information is an example of detection information.

Next, at time t2, the second CPU 23*b* begins to estimate the location of the pedestrian 60 at time t3 after a first forward time Tf1 has elapsed from time t2, based on the pedestrian information representing the pedestrian 60. The time required for estimation processing by the second CPU 23*b* is Tp.

Next, at time t4, the first CPU 23*a* begins to decide to control the vehicle 10 based on the location of the pedestrian 60 at time t3. The time required for decision processing by the first CPU 23*a* is Tk. For example, when the distance between the pedestrian 60 and the vehicle 10 at time t3 is equal to or less than a first distance, the first CPU 23*a* decides to give the driver of the vehicle 10 a warning. When the distance between the pedestrian 60 and the vehicle 10 at time t3 is equal to or less than a second distance which is shorter than the first distance, the first CPU 23*a* decides to stop the vehicle 10.

This detection processing, estimation processing and detection processing are repeated by the object detector 11. Detection processing and decision processing are carried out by the first CPU 23*a*, and estimation processing is carried out by the second CPU 23*b*. The first CPU 23*a* begins to detect moving objects at a detection time having a predetermined detection cycle Tz.

At least some of the processing for estimation of the location of the pedestrian 60 at the second CPU 23*b* is carried out by the first CPU 23*a* in parallel with processing for detection of pedestrians, at a detection time t6 in the next detection cycle Tz.

While estimation processing is being carried out by the second CPU 23*b*, the first CPU 23*a* executes decision processing for the previous detection cycle Tz and detection processing for the next detection cycle Tz. By carrying out the estimation processing, which requires a relatively long time, in parallel with the decision processing and detection processing, it is possible to ensure a long second forward time Tf2 between time t3 and time t5 at which control of the vehicle 10 to the pedestrian 60 at time t3 is decided.

This allows the automatic control device 12 to safely control the vehicle 10 based on control of the vehicle 10 decided by the object detector 11.

The first forward time Tf1 represents the future time at which the location of the pedestrian 60 is estimated in estimation processing. The first forward time Tf1 can be decided in the following manner, as an example. The first forward time Tf1 can be obtained as the sum of a representative estimation time Tpr required for the second CPU 23*b* to estimate the location of the pedestrian 60, a representative relay time Tcr required for the location of the pedestrian 60 estimated by the second CPU 23*b* to be relayed to the first CPU 23*a*, a representative decision time Tkr required for control of the vehicle 10 to be decided by the first CPU 23*a*, and the second forward time Tf2 at which the automatic control device 12 can carry out the control decided by the first CPU 23*a*. Since a relatively near future location of the pedestrian 60 is estimated by the estimation processing, it is possible to estimate the location of the pedestrian 60 to high precision.

In some embodiments, the second forward time Tf2 is decided so as to be long enough for the automatic control device 12 to safely control the vehicle 10.

As shown in FIG. 1B, assuming that processing for detection of the pedestrian 60 by the first CPU 23*a* is to begin at time t4, the second forward time Tf2 may be a value obtained by subtracting a representative detection time Tdr required for detection processing from a third forward time Tf3 between time t3 and time t4, at which the location of the pedestrian 60 is estimated by the second CPU 23*b*, based on detection information representing the pedestrian 60 detected by the first CPU 23*a*.

In this case, since Tf1=Tpr+Tcr+Tkr+Tf2 and Tf3=Tdr+Tf2, the expression Tf1=Tpr+Tcr+Tkr+Tf3−Tdr may be used. In other words, the third forward time Tf3 is the value obtained by subtracting the representative detection time Tdr from the sum of a representative estimation time Tp, the representative relay time Tcr, the representative decision time Tkr and the third forward time Tf3.

In the example shown in FIG. 1B, the detection processing, estimation processing and decision processing are carried out by the same CPU. There is a short time margin Tm between time t3 and time t7 at which control of the vehicle 10 toward the pedestrian 60 is decided. The time margin Tm may not allow the automatic controller 12 to safely control the vehicle 10.

By carrying out the estimation processing parallel in time with decision processing and detection processing at the object detector 11, it is possible to ensure a long second forward time Tf2 between time t3 and time t5 at which control of the vehicle 10 is decided.

As explained above, since the object detector 11 can accurately estimate the future state of a detected moving object and can control the vehicle 10 with ample time, based on the estimated future state of the moving object, it is able to carry out safe control of the vehicle 10.

Figure 2:
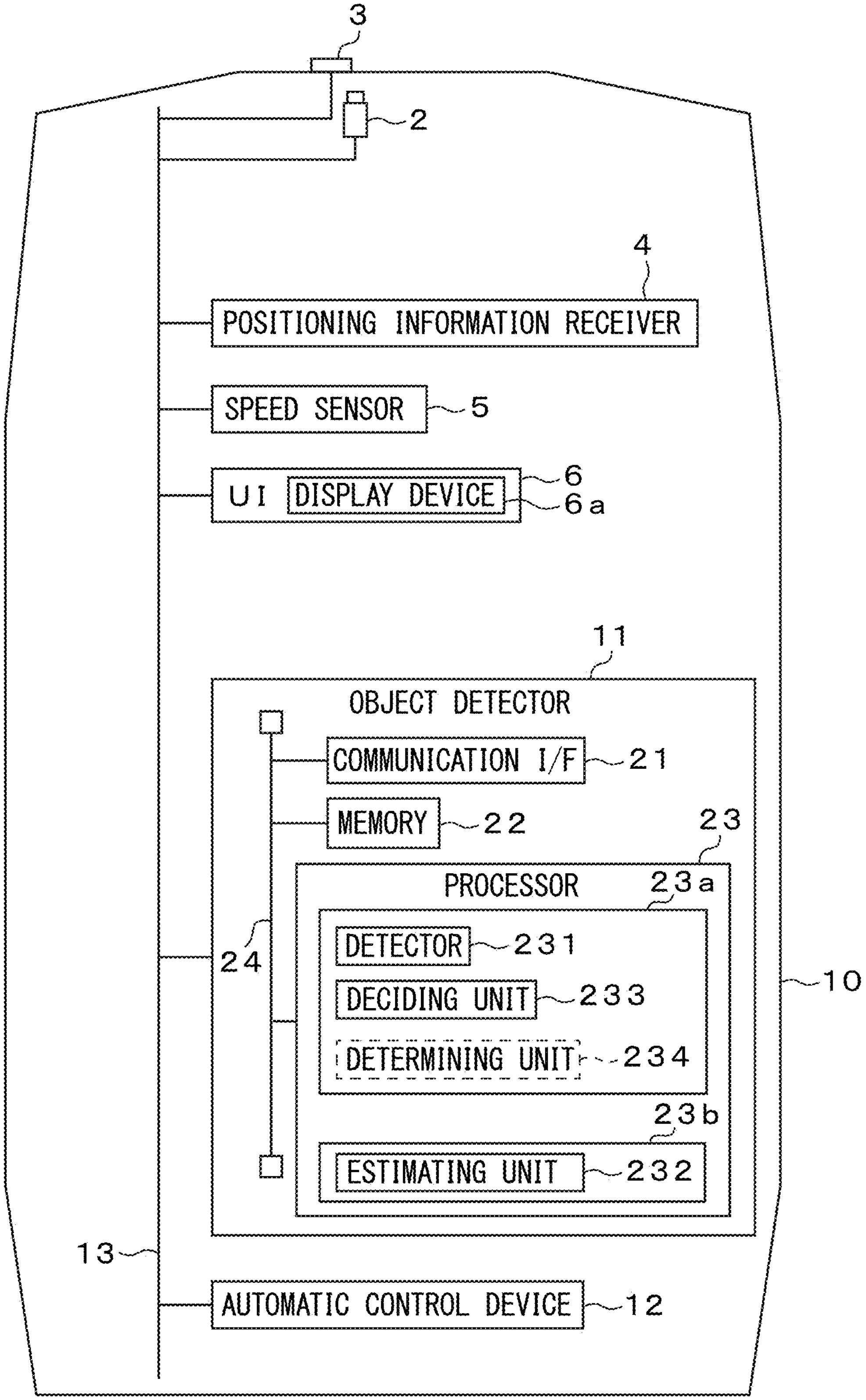
FIG. 2 is a general schematic drawing of a vehicle in which the object detector of the first embodiment is mounted.

FIG. 2 is a general schematic drawing of the vehicle 10 in which the object detector 11 of this embodiment is mounted. The vehicle 10 has a camera 2, a millimeter wave radar 3, a positioning information receiver 4, a speed sensor 5, a user interface (UI) 6, an object detector 11 and an automatic control device 12.

The camera 2, millimeter wave radar 3, positioning information receiver 4, speed sensor 5, user interface (UI) 6, object detector 11 and automatic control device 12 are connected in a communicable manner via an in-vehicle network 13 conforming to the Controller Area Network standard.

The camera 2 is an example of an imaging unit provided in the vehicle 10. The camera 2 is mounted inside the vehicle 10 and directed toward the front of the vehicle 10. The camera 2 takes a camera image in which the environment of a region in a predetermined visual field ahead of the vehicle 10 is shown, at a camera image photograph time set with a predetermined cycle, for example. The camera image can show the road in the predetermined region ahead of the vehicle 10, and road features such as surface lane marking lines on the road. The camera 2 has a 2D detector composed of an array of photoelectric conversion elements with visible light sensitivity, such as a CCD or C-MOS. The camera 2 also has an imaging optical system that forms an image of the photographing region on the 2D detector. The camera image is an example of environment information representing the environment surrounding the vehicle.

Each time a camera image is taken, the front camera 2 outputs the camera image and the camera image photograph time through the in-vehicle network 13 to the object detector 11. At the object detector 11, the camera image is used for processing to detect objects and road features surrounding the vehicle 10.

The millimeter wave radar 3 is mounted on the outer side of the vehicle 10, for example, being directed toward the front of the vehicle 10. The millimeter wave radar 3 emits a scanning millimeter wave toward the predetermined visual field in front of the vehicle 10, at a reflected wave information acquisition time set with a predetermined cycle. The millimeter wave radar 3 also receives a reflected wave that has been reflected from a reflector. The time required for the reflected wave to return contains information for the distance between the vehicle 10 and other objects located in the direction in which the millimeter waves have been emitted. The millimeter wave radar 3 outputs the reflected wave information, together with the reflected wave information acquisition time at which the millimeter wave was emitted, through the in-vehicle network 13 to the object detector 11. The reflected wave information includes the direction in which the millimeter wave was emitted and the time required for the reflected wave to return. The reflected wave information acquisition time represents the time at which the millimeter wave was emitted. At the object detector 11, the reflected wave information is used for processing to detect objects surrounding the vehicle 10. The reflected wave information is an example of environment information representing the environment surrounding the vehicle.

The positioning information receiver 4 outputs positioning information that represents the current location of the vehicle 10. The positioning information receiver 4 may be a GNSS receiver, for example. The positioning information receiver 4 outputs positioning information and the positioning information acquisition time to the object detector 11 and automatic control device 12, each time positioning information is acquired at a predetermined receiving cycle. The positioning information acquisition time represents the time at which the positioning information was acquired.

The speed sensor 5 detects speed information representing the speed of the vehicle 10. The speed sensor 5 has a measuring device that measures the rotational speed of the tires of the vehicle 10. The speed sensor 5 outputs the speed information to the object detector 11 and automatic control device 12 via the in-vehicle network 13. The speed information is used for processing by the object detector 11 and automatic control device 12 to calculate the speed of the vehicle 10.

The UI 6 is an example of the notification unit. The UI 6, controlled by the object detector 11 and automatic control device 12, notifies the driver of the vehicle 10 traveling information. The vehicle 10 traveling information includes the current location of the vehicle, and notifications to the driver. The UI 6 has a display device 6*a* such as a liquid crystal display or touch panel, for display of the traveling information. The UI 6 may also have an acoustic output device (not shown) to notify the driver of traveling information. The UI 6 also creates an operation signal in response to operation of the vehicle 10 by the driver. The UI 6 also has a touch panel or operating button, for example, as an input device for inputting operation information from the driver to the vehicle 10. The UI 6 outputs the input operation information to the object detector 11 and automatic control device 12 via the in-vehicle network 13.

The object detector 11 carries out object detection processing, estimation processing and decision processing. For this purpose, the object detector 11 has a communication interface (IF) 21, a memory 22 and a processor 23. The communication interface 21, memory 22 and processor 23 are connected via signal wires 24. The communication interface 21 has an interface circuit to connect the object detector 11 with the in-vehicle network 13.

The memory 22 is an example of a storage unit, and it has a volatile semiconductor memory and a non-volatile semiconductor memory, for example. The memory 22 stores an application computer program and various data to be used for information processing carried out by the processor 23.

All or some of the functions of the object detector 11 are carried out by functional modules driven by a computer program operating on the processor 23, for example. The processor 23 has a detector 231, an estimating unit 232 and a deciding unit 233. Alternatively, the functional module of the processor 23 may be a specialized computing circuit in the processor 23. The processor 23 has one or more CPUs (Central Processing Units) and their peripheral circuits. The processor 23 may also have other computing circuits such as a logical operation unit, numerical calculation unit or graphics processing unit. The processor 23 has the first CPU 23*a* and second CPU 23*b*. The first CPU 23*a* executes detection processing by the detector 231 and decision processing by the deciding unit 233. The second CPU 23*b* executes estimation processing by the estimating unit 232.

The detector 231 begins detection processing at a detection time having a predetermined detection cycle Tz. The detector 231 detects objects around the vehicle 10, and their types, based on camera images. Objects also include moving objects such as pedestrians and vehicles. The detector 231 also detects road features such as lane marking lines and traffic lights, based on camera images. The detector 231 may also detect the lighting states of traffic lights.

The detector 231 has a classifier that detects objects and road features represented in images, by inputting camera images, for example. The classifier may use a deep neural network (DNN) that has been previously trained to detect objects and road features represented in input images, for example. The detector 231 used may also be a classifier other than a DNN.

When an object is a pedestrian, the classifier may be trained to detect the posture of the pedestrian.

The detector 231 may also detect objects around the vehicle 10 based on reflected wave information. The detector 231 may also determine the orientation of an object with respect to the vehicle 10 based on the location of the object in the camera image, and may determine the distance between the object and the vehicle 10, based on the orientation and on the reflected wave information. The detector 231 estimates the location of the object represented in a vehicle coordinate system, for example, based on the current location of the vehicle 10, and the distance of the object from the vehicle 10 and its orientation. The detector 231 may also track an object to be detected from an updated camera image, by matching objects detected in the updated image with objects detected in previous images, according to a tracking process based on optical flow. The tracked object is assigned an object identification number. The detector 231 may also calculate the trajectory of an object being tracked, based on the location of the object in an image updated from a previous image. The detector 231 can estimate the speed of an object with respect to the vehicle 10, based on changes in the location of the object over the course of time. The detector 231 can also estimate the acceleration of an object based on changes in the speed of the object over the course of time. The detector 231 may also calculate the locations of road features in the manner described above. The locations of road features are represented on a vehicle coordinate system, for example.

The detector 231 notifies the automatic control device 12 of object detection information including information representing the object, and road feature information representing road features. The object detection information includes information indicating the type of object that was detected, information indicating its location, and information indicating its speed, acceleration and traveling lane. The object detection information also includes the object identification number of the tracked object. When multiple pedestrians have been detected, the detector 231 relays the object detection information including object identification information for identifying each of the multiple pedestrians, to the automatic control device 12. The detector 231 also generates surrounding information including the location of the lane marking lines representing the road, the location of the traffic light and the lighting state of the traffic light.

The automatic control device 12 controls the vehicle 10 based on the positioning information, speed information, object detection information and road feature information. The automatic control device 12 also generates a driving plan representing a scheduled traveling trajectory for the vehicle 10 until a predetermined time (such as 5 seconds). The automatic control device 12 controls each unit of the vehicle 10 based on the current location of the vehicle 10, the vehicle speed, and the driving plan. The automatic control device 12 generates a steering signal that controls a steering device (not shown), a driving signal that controls a drive unit (not shown), and a braking signal that controls a braking device (not shown), outputting these signals to their respective devices.

When the vehicle 10 is being operated by the driver, the automatic control device 12 may also generate the steering signal, driving signal and braking signal based on driver operation.

The object detector 11 and automatic control device 12 are electronic control units (ECU), for example. For FIG. 2, the object detector 11 and the automatic control device 12 were described as separate devices, but all of the devices may also be constructed as a single device.

Figure 3:
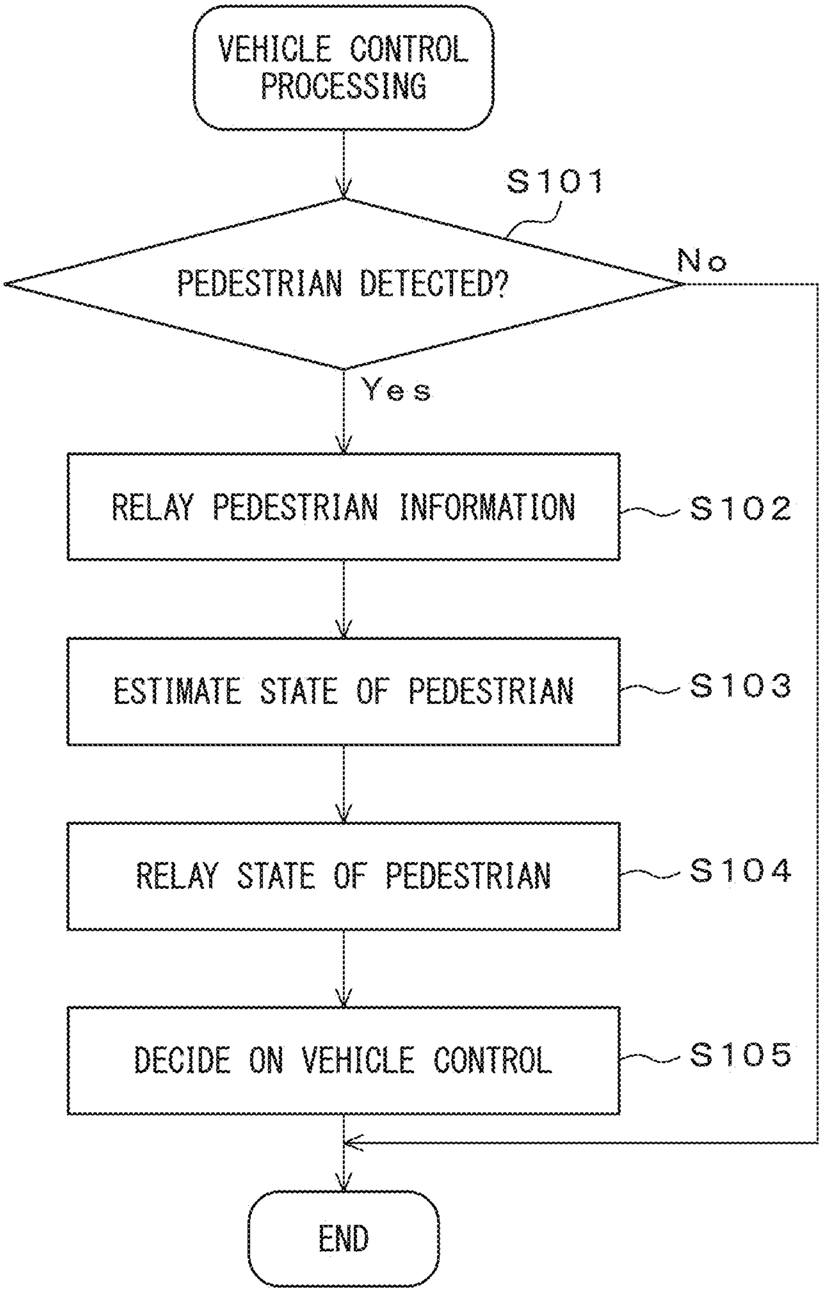
FIG. 3 is an example of an operation flow chart for vehicle control processing by the object detector of the first embodiment.

FIG. 3 is an example of an operation flow chart for vehicle control processing by the object detector 11 of the embodiment. Vehicle control processing by the object detector 11 will now be described with reference to FIG. 3. The object detector 11 carries out vehicle control processing according to the operation flow chart shown in FIG. 3, at a vehicle control time having a predetermined cycle.

First, the detector 231 determines whether or not a pedestrian has been detected (step S101). The pedestrian is an example of a moving object. As mentioned above, detection processing by the detector 231 is carried out by the first CPU 23*a* of the processor 23 at a detection time with a detection cycle Tz.

When a pedestrian has been detected (step S101-Yes), the detector 231 relays the pedestrian information to the estimating unit 232 (step S102). Specifically, the detector 231 relays to the estimating unit 232 pedestrian information that includes the location, speed, acceleration and object identification number of the pedestrian tracked within the most recent predetermined time period. The pedestrian information includes a combination of the locations of the pedestrian within the most recent predetermined time period, and the speed and acceleration at each location. The pedestrian information is an example of detection information.

Estimation processing for the estimating unit 232 is carried out by the second CPU 23*b*. Relay of the pedestrian information from the detector 231 to the estimating unit 232 is carried out based on an operating clock of the first CPU 23*a*, for example. Relay of the pedestrian information from the detector 231 to the estimating unit 232 may be carried out for one cycle of the operating clock of the first CPU 23*a*. Relay of the pedestrian information from the first CPU 23*a* to the second CPU 23*b* may also be carried out with a delayed timing after each cycle. Relay of the pedestrian information from the first CPU 23*a* to the second CPU 23*b* may be modified as appropriate to match the timing of operation of the second CPU 23*b* which carries out estimation processing. The detector 231 may also relay surrounding information, in addition to the pedestrian information, to the estimating unit 232.

The estimating unit 232 then estimates the state of the pedestrian at a time where the first forward time Tf1 has elapsed from the time point at which the pedestrian information was relayed (hereunder also referred to as "estimation time") (step S103). Specifically, the state of the pedestrian represents the location of the pedestrian and the reliability of the pedestrian being at that location, as well as an object identification number used to identify the pedestrian. The first forward time Tf1 used may be 1 second to 5 seconds, for example.

When a pedestrian is located ahead of the vehicle 10 at the estimation time, there is a risk that the vehicle 10 may contact with the pedestrian. The estimating unit 232 therefore estimates the future location of the pedestrian and the deciding unit 233 decides to control the vehicle 10 based on the location of the pedestrian.

The estimating unit 232 has a classifier that detects the location of the pedestrian at the estimation time, by input of pedestrian information. The classifier outputs the location of the pedestrian at the estimation time and the reliability that the pedestrian is at that location, as well as the object identification number identifying the pedestrian. The classifier may use, for example, a deep neural network (DNN) that has been pretrained to detect the location of a pedestrian at a time point where the first forward time Tf1 has elapsed, from input pedestrian information. The classifier may also be trained so as to detect information other than pedestrian locations. The classifier may further be trained to estimate the state of a pedestrian at a time point where the first forward time Tf1 has elapsed, based on pedestrian information including the posture of the pedestrian.

The estimating unit 232 may also estimate the state of the pedestrian at the estimation time based on pedestrian information and surrounding information. The estimating unit 232 may also have a classifier that detects the location of a pedestrian at a time point where the first forward time Tf1 has elapsed, by inputting pedestrian information and surrounding information. The classifier can more accurately estimate the state of the pedestrian when trained so as to estimate the state of the pedestrian at the estimation time based on pedestrian information and surrounding information.

The estimating unit 232 then relays the state of the pedestrian at the estimation time to the deciding unit 233 (step S104). Specifically, the estimating unit 232 relays to the deciding unit 233 the location of the pedestrian at the estimation time and the reliability of the pedestrian being at that location.

Decision processing by the deciding unit 233 is carried out by the first CPU 23*a* of the processor 23. The second CPU 23*b* relays the state of the pedestrian at the estimation time to the first CPU 23*a*. Relay of the state of the pedestrian from the estimating unit 232 to the deciding unit 233 may be carried out for one cycle of the operating clock of the second CPU 23*b*. Relay of the pedestrian information from the second CPU 23*b* to the first CPU 23*a* may also be carried out with a delayed timing after each cycle. Relay of the pedestrian information from the first CPU 23*a* to the second CPU 23*b* may be modified as appropriate to match the timing of operation of the first CPU 23*a* which carries out estimation processing. The time required for relay of the state of the pedestrian from the estimating unit 232 to the deciding unit 233 corresponds to relay time Tc in FIG. 1A.

The deciding unit 233 then decides to control the vehicle 10 based on the state of the pedestrian, and the series of processing steps is complete (step S105). Specifically, when the reliability of the pedestrian location is equal to or greater than a predetermined reference reliability, the deciding unit 233 decides to control the vehicle 10 based on the state of the pedestrian. When the reliability of the pedestrian location is lower than the reference reliability, the series of processing steps is complete. This is because the vehicle 10 cannot be safely controlled based on a pedestrian location with low reliability.

First, the deciding unit 233 estimates the location of the vehicle 10 at the estimation time based on the current location of the vehicle 10 and the speed of the vehicle 10. The deciding unit 233 calculates the distance between the location of the pedestrian and the location of the vehicle 10 at the estimation time.

When the distance between the location of the pedestrian and the vehicle 10 is within a first reference distance at the estimation time, the deciding unit 233 decides to give the driver a warning using the UI 6. The deciding unit 233 displays the warning to the driver using the display device 6*a*, for example. The driver may operate the vehicle 10 manually in response to the warning, for example.

When the distance between the location of the pedestrian and the vehicle 10 at the estimation time is equal to or less than a second reference distance which is shorter than the first reference distance, it is decided to stop the vehicle 10. The deciding unit 233 relays to the automatic control device 12 a stop request for stopping the vehicle 10. The automatic control device 12 stops the vehicle 10 in response to the stop request.

When the distance between the location of the pedestrian and the vehicle 10 is longer than the first reference distance at the estimation time, the series of processing steps is complete. When a pedestrian has not been detected (step S101-No), the series of processing steps is likewise complete.

The first forward time Tf1 in the estimation processing described above will now be explained with reference to FIG. 1A. The estimating unit 232 estimates the future location of the pedestrian with respect to the time at which the pedestrian information was relayed. Specifically, the location of the pedestrian is estimated at a time where the first forward time Tf1 has elapsed from the time point at which the pedestrian information was relayed (the estimation time).

The first forward time Tf1 can be obtained as the sum of a representative estimation time Tpr required for the second CPU 23*b* to estimate the state of the pedestrian 60, a representative relay time Tcr required for the state of the pedestrian 60 estimated by the second CPU 23*b* to be relayed to the first CPU 23*a*, a representative decision time Tkr required for control of the vehicle 10 to be decided by the first CPU 23*a*, and the second forward time Tf2 at which the automatic control device 12 can carry out the control decided by the first CPU 23*a*.

The time required to estimate the state of the pedestrian may vary depending on the positional relationship between the pedestrian and vehicle and the number of pedestrians. The representative estimation time Tpr is the average value required for the first CPU 23*a* to estimate the location of the pedestrian under typical conditions. The representative estimation time Tpr may also be the maximum required time for the first CPU 23*a* to estimate the location of the pedestrian under expected conditions.

The time required for relay of information from the second CPU 23*b* to the first CPU 23*a* may vary depending on the operating state of the first CPU 23*a* and second CPU 23*b* and on the amount of information to be relayed. The representative relay time Tcr is the average time required for relay of typical information from the second CPU 23*b* to the first CPU 23*a*. The representative relay time Tcr may also be the maximum time required for relay of typical information from the second CPU 23*b* to the first CPU 23*a* under expected conditions.

The time required for the first CPU 23*a* to detect a pedestrian may vary depending on the number of camera images and pedestrians represented in the camera images. The representative detection time Tdr is the average time required for the first CPU 23*a* to detect a pedestrian under typical conditions. The representative detection time Tdr may also be the maximum time required for the first CPU 23*a* to detect a pedestrian under expected conditions.

The time required for the first CPU 23*a* to decide on control of the vehicle 10 may vary depending on the state of the vehicle 10, the positional relationship between the vehicle 10 and pedestrians, and the number of pedestrians. The representative decision time Tkr is the average time required for the first CPU 23*a* to decide on control of the vehicle 10 under typical conditions. The detection time Tkr may also be the maximum time required for the first CPU 23*a* to decide on control of the vehicle 10 under expected conditions.

The estimation time Tpr, relay time Tcr, decision time Tkr and second forward time Tf2 are components of the first forward time Tf1.

The estimation time Tpr, relay time Tcr and decision time Tkr are times necessary for processing. The second forward time Tf2 can be determined as a balance between the point where safe control is possible and the point where precise estimation of the state of the pedestrian is possible. Since a relatively near future location of the pedestrian 60 is estimated by the estimation processing, it is possible to estimate the location of the pedestrian 60 to high precision.

The concept for deciding on the second forward time Tf2 is not limited and may be decided in the following manner, as an example. As shown in FIG. 1B, assuming that processing for detection of a pedestrian 60 by the detector 231 has begun at time t4, the location of the pedestrian 60 is estimated by the estimating unit 232 at time t3 based on pedestrian information representing the pedestrian 60. The second forward time Tf2 may also be a value obtained by subtracting the representative detection time Tdr required for detection processing from the third forward time Tf3 between time t3 and time t4.

By carrying out the estimation processing parallel in time with decision processing and detection processing at the object detector 11, it is possible to ensure a long second forward time Tf2 between time t3 and time t5 at which control of the vehicle 10 is decided. In the example shown in FIG. 1B, the time margin Tm is short.

As explained above, since the object detector of this embodiment can accurately estimate the future state of a detected moving object and can control the vehicle with ample time, based on the estimated future state of the moving object, the object detector is able to carry out safe control of the vehicle.

The object detector of the second embodiment will now be described with reference to FIG. 4 to FIG. 6. The explanation of the first embodiment is to be applied for any aspects of the second embodiment that are not explained here.

For this embodiment, the processor 23 has a determining unit 234 that determines estimation processing by the estimating unit 232. The determining unit 234 is a functional module driven by a computer program operating on the first CPU 23*a* of a processor 23, for example.

Figure 4:
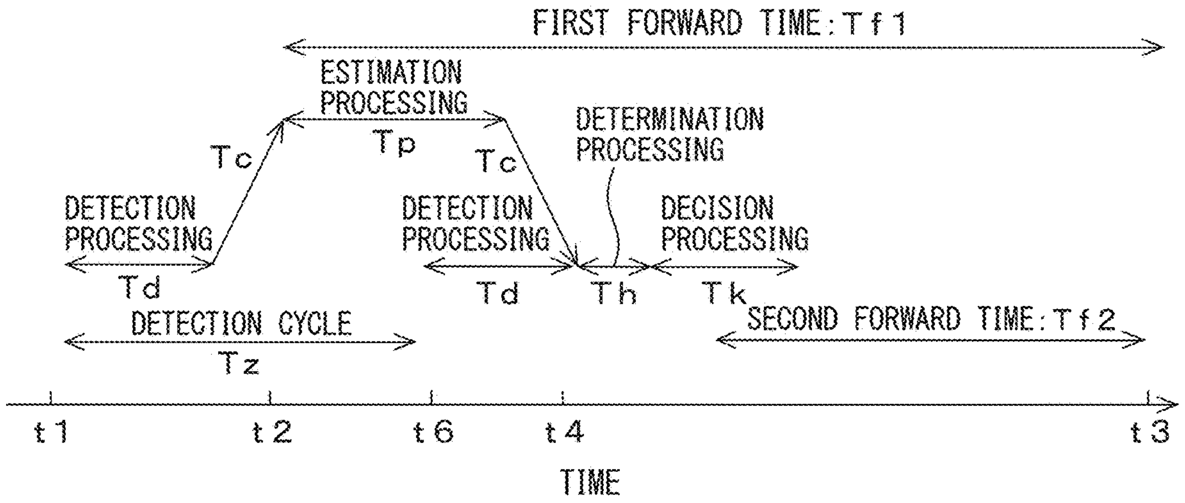
FIG. 4 is a diagram showing operation of an object detector of a second embodiment.

FIG. 4 is a diagram showing operation of an object detector 11 of this embodiment. At time t6, the detector 231 carries out detection processing based on environment information. Based on pedestrian information representing a pedestrian detected by the detector 231 at time t6, the determining unit 234 determines whether or not the state of the pedestrian estimated by the estimating unit 232 is correct.

Specifically, the determining unit 234 determines whether or not the state of the pedestrian is correct as estimated by the estimating unit 232, based on pedestrian information representing the pedestrian detected by the detector 231 at detection time t1 in the previous detection cycle Tz, in turn based on pedestrian information representing the pedestrian detected by the detector 231 at detection time t6 of the next detection cycle Tz. The time required for determination processing by the determining unit 234 is Th. The time Th is sufficiently shorter than the time Tp required for estimation processing. The automatic control device 12 can therefore adequately control the vehicle 10 during the second forward time Tf2.

The second forward time Tf2 may also be lengthened by a representative assessment time Thr required for determination processing. This corresponds to shifting the estimation time t3 into the future by the assessment time Thr. The first forward time Tf1 may also be the sum of the estimation time Tpr, relay time Tcr, decision time Tkr, assessment time Thr and second forward time Tf2.

The time required for determination by the first CPU 23*a* may vary depending on the number of pedestrians represented in the camera images. The representative assessment time Thr is the average time required for determination by the first CPU 23*a* under typical conditions. The representative assessment time Thr may also be the maximum time required for determination by the first CPU 23*a* under expected conditions.

When the state of the pedestrian as estimated by the estimating unit 232 is correct, the deciding unit 233 decides on control of the vehicle 10 based on the state of the pedestrian estimated by the estimating unit 232.

When the state of the pedestrian as estimated by the estimating unit 232 is not correct, on the other hand, the deciding unit 233 estimates the state of the pedestrian at time t3 in a shorter period than the estimating unit 232, based on the pedestrian information detected by the detector 231 at time t6. The deciding unit 233 that is driven by the first CPU 23*a* is an example of the second estimating unit. The deciding unit 233 decides on control of the vehicle 10 based on the estimated state of the pedestrian.

The detector 231 begins detection processing at a detection time t6 having a detection cycle Tz. Time t6 is the next detection time after time t1 in which the previous detection processing was carried out.

Figure 5:
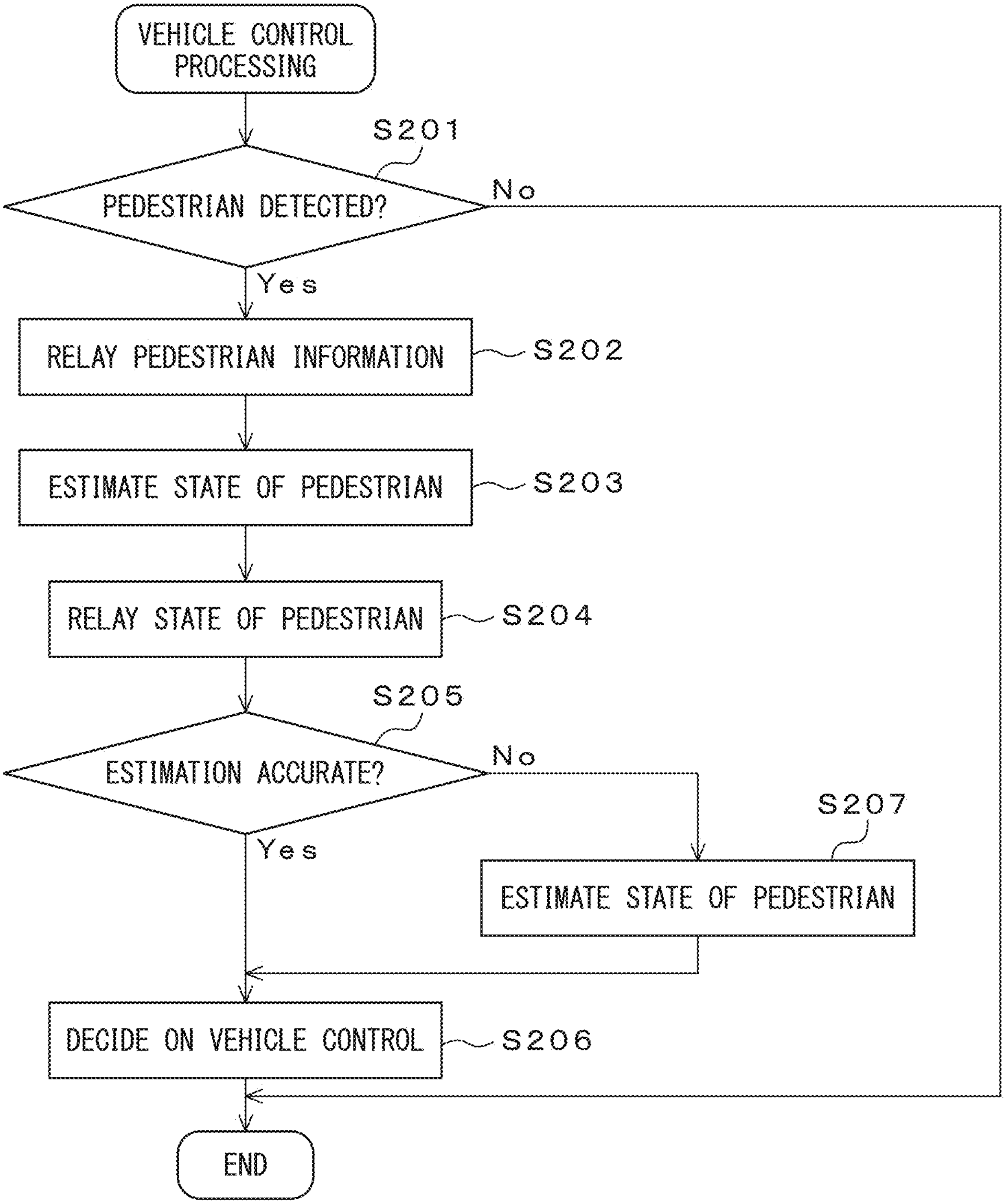
FIG. 5 is an example of an operation flow chart for vehicle control processing by the object detector of the second embodiment.

FIG. 5 is an example of an operation flow chart for vehicle control processing by the object detector 11 of the embodiment. For the operation flow chart shown in FIG. 5, the processing in steps S205 and S207 have been added to the operation flow chart shown in FIG. 3. The processing in steps S201 to S204 and S206 are the same as in steps S101 to S105 described above.

In step S204, the estimating unit 232 relays the state of the pedestrian at the estimation time to the deciding unit 233 and determining unit 234.

Based on pedestrian information representing a pedestrian detected by the detector 231 at time t6, the determining unit 234 then determines whether or not the state of the pedestrian is correct as estimated by the estimating unit 232 (step S205). Determination processing by the determining unit 234 will be described below with reference to FIG. 6.

When the estimated state of the pedestrian is correct (step S205-Yes), the deciding unit 233 decides on control of the vehicle 10 based on the state of the pedestrian estimated by the estimating unit 232 (step S206), and the series of processing steps is complete.

When the estimated state of the pedestrian is not correct, on the other hand (step S205-No), the deciding unit 233 estimates the state of the pedestrian at time t3, where the first forward time Tf1 has elapsed after time t2, in a shorter period than the estimating unit 232, based on pedestrian information representing the pedestrian detected by the detector 231 at time t6 (step S207).

The deciding unit 233 may estimate the state of the pedestrian using linear prediction, for example. Specifically, the deciding unit 233 estimates the location of the pedestrian at time t3 based on the location, direction and speed of the pedestrian at time t6. The direction of the pedestrian at time t6 is calculated based on locations of the pedestrian within the most recent predetermined period, for example. The time required for estimation processing using linear prediction is shorter than estimation processing using a classifier.

The deciding unit 233 then decides to control the vehicle 10 based on the state of the pedestrian as estimated by the deciding unit 233 (step S206), and the series of processing steps is complete.

Figure 6:
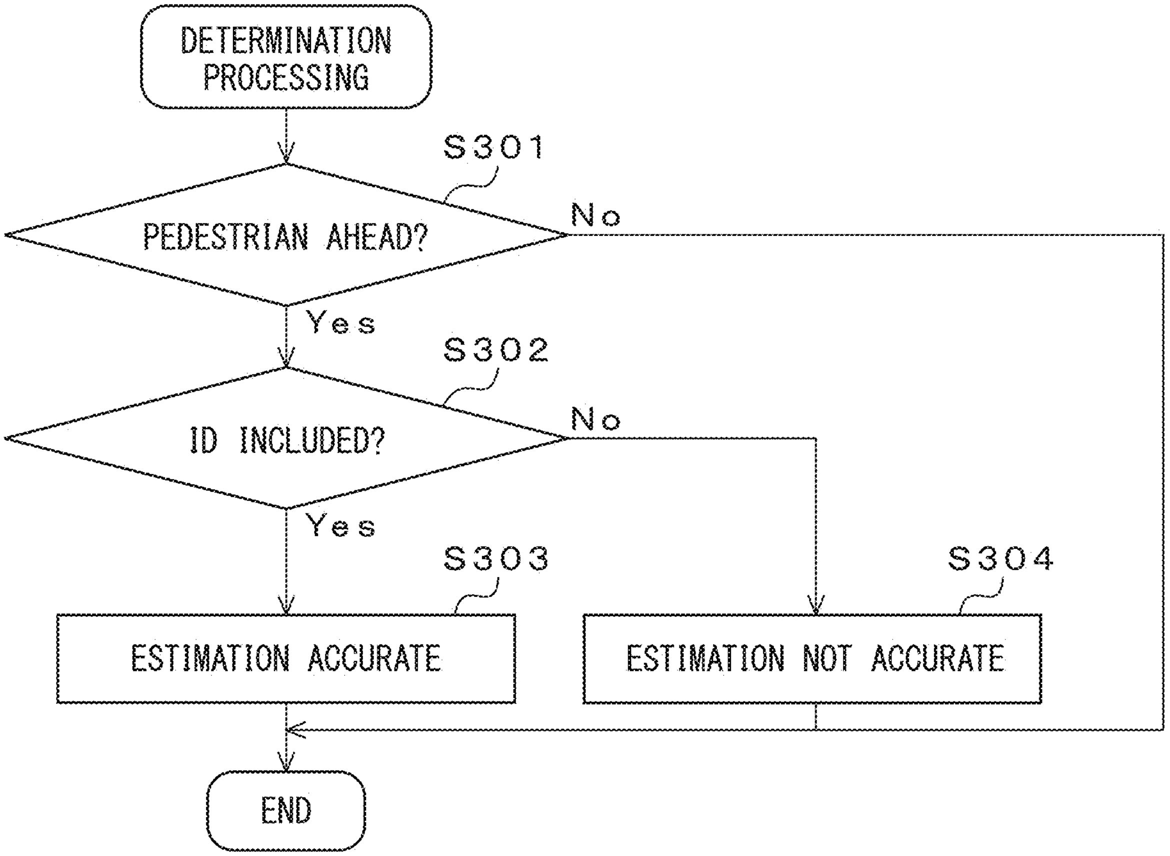
FIG. 6 is an example of an operation flow chart for determination processing by the object detector of the second embodiment.

FIG. 6 is an example of an operation flow chart for determination processing by the object detector 11 of the embodiment. In step S206 described above, the determining unit 234 carries out determination processing according to the operation flow chart shown in FIG. 6.

First, the determining unit 234 determines whether or not the pedestrian is located ahead of the vehicle 10, based on pedestrian information relayed by the estimating unit 232 (step S301). When the location of the pedestrian is equal to or less than a predetermined reference distance from a straight line drawn in the traveling direction from the current location of the vehicle 10, the determining unit 234 determines that the pedestrian is located ahead of the vehicle 10. The location of the vehicle 10 may be its center of gravity, for example.

When the location of the pedestrian is further than the predetermined reference distance from a straight line drawn in the traveling direction of the vehicle 10 from the current location of the vehicle 10, on the other hand, the determining unit 234 determines that the pedestrian is not located ahead of the vehicle 10. The reference distance may be 2 m to 5 m, for example.

When the pedestrian is located ahead of the vehicle 10 (step S301-Yes), the determining unit 234 determines whether or not the object identification number ID included in the pedestrian information relayed by the estimating unit 232 (hereunder also referred to as "estimated object identification number ID") is included in the pedestrian information detected by the detector 231 at time t6 (hereunder also referred to as "current pedestrian information") (step S302). When a pedestrian has been detected by the detector 231 at time t6, the pedestrian information includes an object identification number representing the pedestrian.

When the pedestrian represented by the estimated object identification number ID is included in the current pedestrian information (step S302-Yes), the determining unit 234 determines that the state of the pedestrian as estimated by the estimating unit 232 is correct (step S303). Since the pedestrian included in the pedestrian information relayed by the estimating unit 232 has been detected by the detector 231 at time t6, estimation by the estimating unit 232 is presumably correct.

When the pedestrian represented by the estimated object identification number ID is not included in the current pedestrian information (step S302-No), on the other hand, the determining unit 234 determines that the state of the pedestrian as estimated by the estimating unit 232 is not correct (step S304). Since the pedestrian included in the pedestrian information relayed by the estimating unit 232 has not been detected by the detector 231 at time t6, estimation by the estimating unit 232 is presumably not correct. The case where a pedestrian has not been detected at time t6 is one case in which the pedestrian represented by the estimated object identification number ID is not included in the current pedestrian information.

The estimation results by the estimating unit 232 are sometimes incorrect because the future state of the pedestrian is being estimated. For this embodiment, therefore, the determining unit 234 determines the validity of the estimation results by the estimating unit 232. When the state of the pedestrian as estimated by the estimating unit 232 is not correct, the vehicle 10 is safely controlled by deciding to control the vehicle 10 based on the most recent detection results.

As explained above, the object detector of this embodiment determines the validity of the estimated states of moving objects, thus allowing safer control of a vehicle. The object detector of this embodiment exhibits the same effect as the first embodiment.

The vehicle control device according to the embodiment described above may incorporate appropriate modifications that are still within the gist of the present disclosure. Moreover, the technical scope of the disclosure is not limited to these embodiments, and includes the present disclosure and its equivalents as laid out in the Claims.

For example, the estimation processing of the embodiment described above was carried out by a different CPU from the CPU that carried out detection processing and decision processing. When estimation processing, detection processing and decision processing can be carried out in parallel by a single CPU, however, the estimation processing, detection processing and decision processing may be carried out by the same CPU.

The estimation processing in the embodiment described above merely serves as an example, and estimation processing may also be carried out by other methods. Moreover, pedestrians were the moving objects whose states were estimated in the embodiment described above, but the moving objects may be objects other than pedestrians. For example, a moving object may be an automobile or a bicycle.

The invention claimed is:

1. A vehicle control device comprising:

a processor configured to;

begin detection of a moving object, based on environment information representing an environment surrounding a vehicle, at a detection time having a predetermined detection cycle, with at least some of processing for estimating a first state of the moving object being carried out in parallel with processing for detection of the moving object at the detection time in a next detection cycle, estimate the first state of the moving object at an estimation time where a first forward time has elapsed, based on detection information representing the detected moving object, estimate a second state of the moving object in a period of time shorter than time required for estimating the first state of the moving object, based on the detection information representing the moving object detected at the detection time in the next detection cycle, determine whether or not the first state of the moving object is correct as estimated based on the detection information representing the detected moving object at the detection time during a previous detection cycle, based on the detection information representing the detected moving object at the detection time during the next detection cycle, and control the vehicle based on the estimated first state of the moving object when it has been determined that the estimated first state of the moving object is correct, and control the vehicle based on the estimated second state of the moving object when it has been determined that the estimated first state of the moving object is not correct, wherein the first forward time is a sum of a representative estimation time required to estimate the first state of the moving object, a representative relay time required to relay the estimated first state of the moving object, a representative decision time required to decide on control of the vehicle, and a second forward time which allows the control to be carried out.

2. The vehicle control device according to claim 1, wherein the processor is further configured to estimate the first state of the moving object using a trained classifier, and to estimate the second state of the moving object using linear prediction.

3. The vehicle control device according to claim 1, wherein the first forward time is obtained by subtracting the representative detection time required for detection of the moving object, from a sum of a third forward time between the estimation time at which the first state of the moving object is estimated based on the detection information representing the detected moving object and the time at which processing for detection of the moving object begins, assuming that processing has begun for detection of the moving object at the time where processing for decision of control of the vehicle begins, and the representative estimation time, the representative relay time and the representative decision time.

* * * * *